United States Patent Office 3,115,893
Patented Dec. 31, 1963

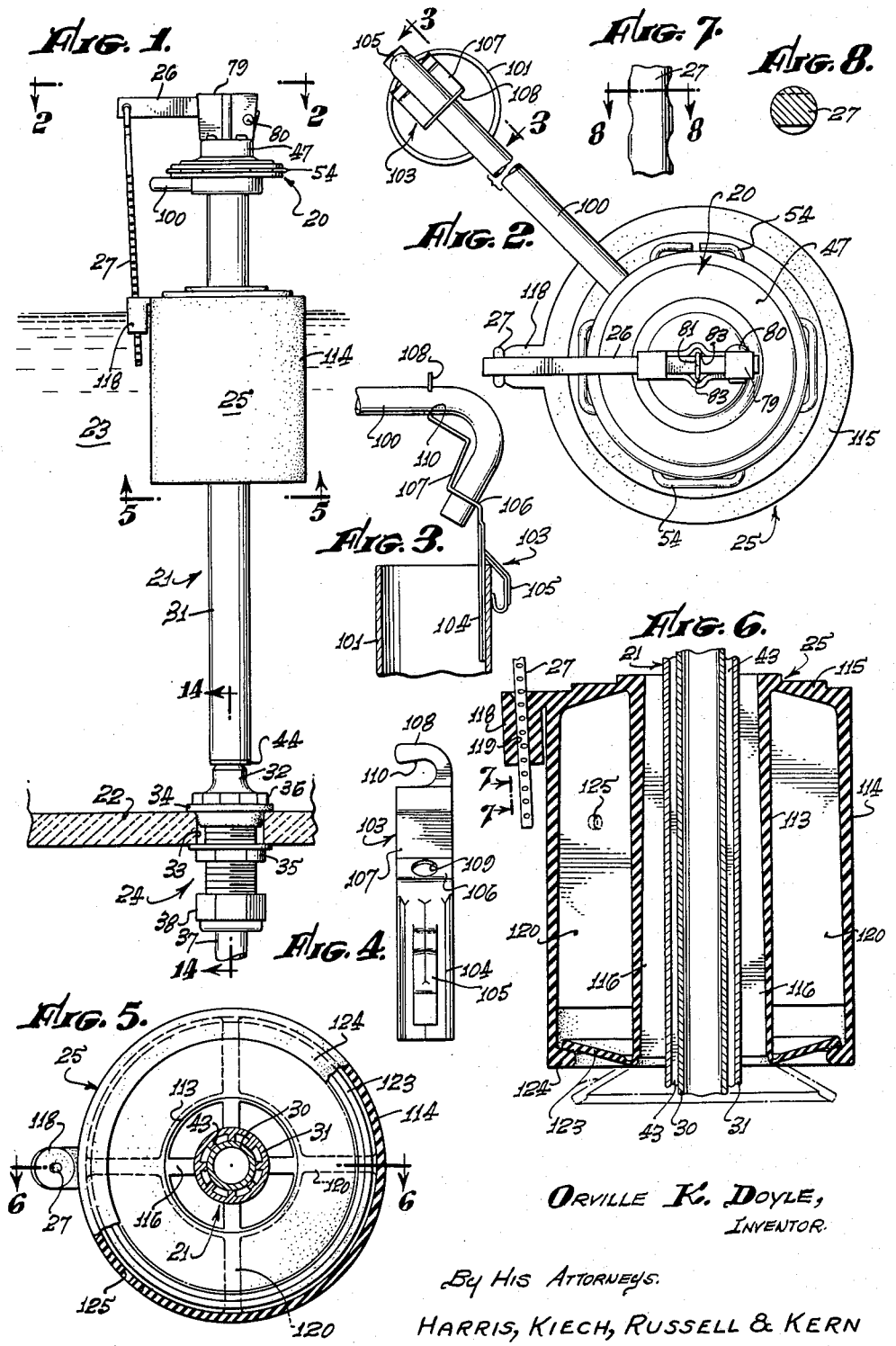

3,115,893
CHECK VALVE
Orville K. Doyle, 11961 E. Las Palmas Drive,
Fullerton, Calif.
Original application Oct. 25, 1957, Ser. No. 692,484, now Patent No. 2,986,155, dated May 30, 1961. Divided and this application Mar. 6, 1961, Ser. No. 93,708
2 Claims. (Cl. 137—525.3)

This application is a division of my copending application entitled Valve, Serial No. 692,484, filed October 25, 1957, now Patent No. 2,986,155.

This invention relates to valves and in particular to a float valve or check valve which may be used in a flush tank or the like in conjunction with or in substitution for the conventional ball cocks customarily used. Although the invention is described as incorporated in a flush tank valve, the principles thereof are manifestly applicable in other environments and to other uses.

It is an object of the invention to provide certain improvements on the ball cock valve described in my earlier patent entitled Ball Cock Valve, No. 2,808,850.

A valve such as that shown in my copending application may be operated with a hollow float positioned concentric with the standpipe supporting the valve, the float having sides and top and open bottom forming an air trapping enclosure so that a substantial amount of water will enter the float through the bottom when the tank is filling and so that water will flow out of the tank faster than it flows out of the float when the tank is emptying, thereby increasing the downward force on the float due to gravity which serves to open the valve and start the filling operation.

Another object of the invention is to provide a float having a valve structure in the bottom thereof which permits fluid flow into the float only through the bottom. A further object of the invention is to provide a hollow float with a bottom closure which may be molded of a flexible material, the closure comprising a flap or flange having a relaxed or initial position from which it may be flexed to a closed or float sealing position and then flexed beyond the closed position to an open position, the flange urging itself from the open position towards the closed position.

Other improvements in valve construction and additional novel combinations and arrangements of parts will more fully appear in the course of the following description. The drawing merely shows and the description merely describes preferred embodiments of the present invention which are given by way of illustration or example.

In the drawing, wherein like parts in different figures are designated by the same numerals:

FIG. 1 is a side view of a preferred embodiment of the invention shown mounted in a flush tank or the like;

FIG. 2 is an enlarged view taken along the line 2—2 of FIG. 1;

FIG. 3 is a partial sectional view taken along the line 3—3 of FIG. 2;

FIG. 4 shows the clip of FIG. 3 as a separate item;

FIG. 5 is an enlarged sectional view taken along the line 5—5 of FIG. 1;

FIG. 6 is a sectional view taken along the line 6—6 of FIG. 5;

FIG. 7 is an enlarged view taken along the line 7—7 of FIG. 6; and

FIG. 8 is a sectional view taken along the line 8—8 of FIG. 7.

Referring now to FIG. 1, the valve of the invention is contained in a housing 20 mounted atop a standpipe 21 which is fixed in a bottom 22 of a tank 23 by a coupling 24. A float 25 is also located in the tank 23 and is coupled to a valve-actuating lever 26 by a float rod 27.

The standpipe 21 includes an inlet pipe 30 concentrically positioned within an outlet pipe 31, the lower end of the inlet pipe 30 being threadedly engaged with the upper end of a tube 32 of the coupling 24.

The tube 32 is clamped in an opening 33 in the bottom 22 of the tank by a resilient washer 34 and a nut 35 which engages threads on the exterior of the tube 32. A plurality of flat surfaces are formed on an outwardly flared portion 36 of the tube 32 providing gripping surfaces for a wrench. A pipe 37, which is connected to the source of fluid for filling the tank, may be clamped to the lower end of the tube 32 by a threaded cap 38, a washer and a resilient washer within the cap so that when the cap 38 is screwed onto the tube 32, the resilient washer will be compressed around the pipe 37 to clamp it in position.

The outlet pipe 31 may be provided with a plurality of ribs 43 projecting radially inward to engage the inlet pipe 30 for maintaining the two pipes in their relative positions and providing for fluid flow in the annular space between the pipes (FIG. 5). An apertured washer 44 rests on the top of the coupling tube 32 around the inlet pipe 30, with the bottom end of the outlet pipe preferably resting on the outer edge of the washer 44. The upper corner of the tube 32 is preferably chamfered permitting larger openings in the washer and also for deflecting the downward flowing fluid.

It has been found that a quieter and more stable valve structure is obtained when there is some back pressure in the unit and therefore it is preferred to have the openings in the washer 44 limit the rate of flow rather than doing so at a preceding point along the flow path.

The float of the present invention is suitable for use with any type of valve and no detail description of a ball cock valve will be given herein. For a typical valve, see my aforesaid copending application wherein the valve of FIG. 1 is fully illustrated and described.

A preferred form for the float 25 is shown in detail in FIGS. 5 and 6, the float being concentrically positioned about the standpipe 21. However, it is understood that the valve of the invention may be operated with a float positioned beside the standpipe or with the conventional ball type float. The float 25 is a hollow structure having concentric inner and outer walls 113, 114 and a top 115 joining the inner and outer walls. Ribs 116 project radially inward from the inner wall 113 serving as a guide for movement of the float along the standpipe. A boss 118 projects outward from the outer wall 114 and has an opening 119 therein which is a push fit for the float rod 27, the float rod being formed with a plurality of dimples or serrations therealong for engagement with the material of the boss (FIGS. 7 and 8). Stiffner ribs 120 are provided within the hollow float between the inner and outer walls.

The bottom of the float includes a flexible flap or flange 123 which acts as a check valve, permitting flow of fluid only into the float. The periphery of the flap 123 rests on an inturned shoulder 124 at the bottom of the outer wall 114 blocking flow of fluid from the float to the tank through the bottom of the float but permitting upward motion of the flap for flow of fluid into the float. This check valve structure is easily manufactured by molding the float of a flexible material such as rubber with the flap in the position shown in phantom lines in FIG. 6. Then the flap is pushed past the shoulder 124 to the position shown in solid lines in FIG. 6 and the resiliency of the flap material urges the flap into engagement with the shoulder 124, thereby requiring a certain amount of pressure to deflect the flap and permit fluid flow into the float.

A small opening 125 is provided in the outer wall 114 of the float. As the tank is being filled with fluid, fluid will pass into the float past the flap 123 and a portion of the air trapped within the float will escape through the opening 125. However, when the tank is emptied, the check valve flap 123 will retain this water within the float, thereby making the float quite heavy providing positive action for the valve mechanism. This form of construction allows the float to be light in weight and inexpensive to manufacture, yet to serve as a heavy float when actually in operation.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

I claim as my invention:

1. A check valve comprising an annular housing with inner and outer concentric walls and an inlet opening and an outlet opening for fluid flow through said housing, and including an annular sealing shoulder projecting into said inlet opening from said outer wall, and an inwardly opening, annular, flexible flap formed integral with said inner wall at said inlet opening and having a shoulder-engaging portion, said flap having a relaxed position with the shoulder-engaging portion positioned upstream of said shoulder, with said flap being flexed downstream past said shoulder from said relaxed position to urge said shoulder-engaging portion upstream into sealing engagement with said shoulder.

2. A check valve comprising a unitary molded structure including a housing with concentric inner and outer walls defining a passage for fluid flow therebetween, an annular sealing shoulder projecting into said passage from said outer wall, and an annular flexible flange formed at the upstream end of said inner wall and projecting into said passage opposite said shoulder, said flange having a molded initial relaxed position with the outer edge thereof disposed upstream of said shoulder, with said flange flexed downstream past said shoulder from said relaxed position to a stressed working position to urge itself upstream into sealing engagement with said shoulder.

References Cited in the file of this patent

UNITED STATES PATENTS

| | | |
|---|---|---|
| 2,270,468 | Osborn | Jan. 20, 1942 |
| 2,329,960 | Jerheul | Sept. 21, 1943 |
| 2,646,819 | Lippold | July 28, 1953 |
| 2,655,175 | Glidden | Oct. 13, 1953 |
| 2,747,605 | Adams | May 29, 1956 |
| 2,753,886 | Powers | July 10, 1956 |
| 2,854,023 | Heyer | Sept. 30, 1958 |
| 2,856,025 | Whited et al. | Oct. 14, 1958 |
| 2,881,795 | Waldenmaier et al. | Apr. 14, 1959 |
| 2,908,287 | Augustin | Oct. 13, 1959 |